(12) United States Patent
Lee et al.

(10) Patent No.: US 9,115,004 B2
(45) Date of Patent: Aug. 25, 2015

(54) NEGATIVE ACTIVE MATERIAL, NEGATIVE ELECTRODE INCLUDING THE SAME, LITHIUM SECONDARY BATTERY INCLUDING NEGATIVE ELECTRODE, AND METHOD OF PREPARING NEGATIVE ACTIVE MATERIAL

(75) Inventors: Jong-Hee Lee, Yongin-si (KR); Yong-Mi Yu, Yongin-si (KR); Joa-Young Jeong, Yongin-si (KR); Jae-Myung Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 119 days.

(21) Appl. No.: 13/493,731

(22) Filed: Jun. 11, 2012

(65) Prior Publication Data

US 2013/0004851 A1   Jan. 3, 2013

(30) Foreign Application Priority Data

Jun. 30, 2011   (KR) .......................... 10-2011-0064919

(51) Int. Cl.
*H01M 4/485*    (2010.01)
*C01G 23/04*    (2006.01)
*C01G 23/00*    (2006.01)
*H01M 4/131*    (2010.01)

(52) U.S. Cl.
CPC ............. *C01G 23/005* (2013.01); *H01M 4/485* (2013.01); *C01P 2002/72* (2013.01); *C01P 2004/03* (2013.01); *C01P 2004/04* (2013.01); *C01P 2004/12* (2013.01); *C01P 2004/54* (2013.01); *C01P 2004/62* (2013.01); *H01M 4/131* (2013.01); *Y02E 60/122* (2013.01)

(58) Field of Classification Search
None
See application file for complete search history.

(56) References Cited

U.S. PATENT DOCUMENTS 6,139,815 A     10/2000   Atsumi et al.
7,541,114 B2 *   6/2009   Ohzuku et al. ............... 429/322
2009/0291354 A1 * 11/2009  Inagaki et al. ................. 429/61

FOREIGN PATENT DOCUMENTS

| | | |
|---|---|---|
| JP | 09-309728 | 12/1997 |
| JP | 2001-192208 A | 7/2001 |
| KR | 2000-0068552 A | 11/2000 |
| KR | 1020100035881 A | 4/2010 |

OTHER PUBLICATIONS

Kim et al. Spinel Li4Ti5O12 Nanowires for High-Rate Li-Ion Intercalation Electrode. The Electrochemical Society. 10 (3) p. A81-A84 (2007).*

Li et al. "Preparation of Li4Ti5O12 Nanorods as Anode Materials for Lithium-Ion Batteries." Institute of New Energy Material Chemistry, Nankai University. Journal of the Electrochemical Society. 156(7) A495-A499. Apr. 28, 2009.*

(Continued)

*Primary Examiner* — Patrick Ryan
*Assistant Examiner* — Christopher Domone
(74) *Attorney, Agent, or Firm* — Knobbe Martens Olson & Bear LLP

(57) ABSTRACT

A negative active material comprising lithium titanate oxide having an area ratio of a diffraction peak of a (111) plane that appears at $2\theta=18.3°\pm0.4$ to a diffraction peak of a (311) plane that appears at $2\theta=35.5°\pm0.4$, in an XRD spectrum, in the range of about 2.2:1 to about 5.5:1, a negative electrode comprising the negative active material, a lithium secondary battery comprising the negative electrode, and a method of preparing the negative active material.

8 Claims, 3 Drawing Sheets

(56) References Cited

OTHER PUBLICATIONS

Office Action issued Mar. 28, 2013, received in connection with Korean Patent Application No. 10-2011-0064919.

Cheng, L., et al., General Synthesis of Carbon-Coated Nanostructure Li4Ti5O12 as a High Rate Electrode Material for Li-ion Intercalation, Journal of Materials Chemistry 20:595-602, Nov. 20, 2009.

* cited by examiner

NEGATIVE ACTIVE MATERIAL, NEGATIVE ELECTRODE INCLUDING THE SAME, LITHIUM SECONDARY BATTERY INCLUDING NEGATIVE ELECTRODE, AND METHOD OF PREPARING NEGATIVE ACTIVE MATERIAL

CROSS-REFERENCE TO RELATED APPLICATIONS

This application claims the benefit of Korean Patent Application No. 10-2011-0064919, filed on Jun. 30, 2011, in the Korean Intellectual Property Office, the disclosure of which is incorporated herein in its entirety by reference.

BACKGROUND

1. Field

One or more embodiments relate to a negative active material comprising lithium titanate oxide, a negative electrode comprising the same, a lithium secondary battery comprising the negative electrode, and a method of preparing the negative active material.

2. Description of the Related Technology

Lithium titanate oxide ($Li_4Ti_5O_{12}$) is known as an electrode material for lithium secondary batteries. $Li_4Ti_5O_{12}$ is less expensive and has a smaller change in volume during charging and discharging processes, as compared to other electrode materials. Thus, when the lithium titanate oxide is applied to lithium secondary batteries, it exhibits excellent rapid charge/discharge characteristics and high performances. Therefore, lithium titanate oxide is expected to be widely used as an electrode material for high-output batteries used in applications requiring rapid charge and discharge, such as hybrid electric vehicles.

Lithium titanate oxide, which draws much attention as an electrode active material for lithium ion secondary batteries, has little change in volume even after repetitive intercalation/deintercalation of lithium ions, thus being highly stable, and also has long lifetime. In addition, lithium titanate oxide has a higher charge/discharge potential, e.g., 1.5V (vs Li/Li+) than general carbonaceous electrode materials, and thus deposition of lithium ions which is caused by decomposition of an electrolyte and rapid charge/discharge does not occur.

For example, lithium titanate oxide has an operating voltage of about 1.3 to about 1.6 V, which is higher than that of general carbonaceous negative electrode materials, and has a reversible capacity of about 170 mAh/g. However, lithium titanate oxide enables rapid charge and discharge, barely undergoes an irreversible reaction, and has a very low heat of reaction, thus being highly stable. Lithium titanate oxide has a theoretical density of about 3.5 $g/cm^3$, which is higher than the theoretical density of carbonaceous negative electrode materials, e.g., about 2 $g/cm^3$, and thus capacity per volume of lithium titanate oxide is similar to that of carbonaceous negative electrode materials.

Conventionally, the size of lithium titanate oxide is reduced to fine particles, thereby expanding an active surface thereof, which leads to rapid diffusion of lithium ions, and thus lithium titanate oxide may be used as a high input/output material.

SUMMARY

One or more embodiments comprise a negative active material for a lithium secondary battery which has enhanced high-rate characteristics.

One or more embodiments comprise a method of preparing the negative active material.

One or more embodiments comprise a negative electrode for a lithium secondary battery which comprises the negative active material.

One or more embodiments comprise a lithium secondary battery comprising the negative electrode.

Additional aspects will be set forth in part in the description which follows and, in part, will be apparent from the description, or may be learned by practice of the presented embodiments.

According to one or more embodiments, a negative active material comprises lithium titanate oxide having an area ratio of a diffraction peak of a (111) plane that appears at $2\theta=18.3°\pm0.4$ to a diffraction peak of a (311) plane that appears at $2\theta=35.5°\pm0.4$, in an X-ray diffraction spectrum, of about 2.2:1 to about 5.5:1.

According to one or more embodiments, a negative electrode comprises the negative active material described above.

According to one or more embodiments, a lithium secondary battery comprises the negative electrode, a positive electrode, and a separator.

According to one or more embodiments, a method of preparing a negative active material comprises preparing a titania precursor seed; growing the titania precursor seed to prepare a rod-type titania precursor; first-sintering the rod-type titania precursor to prepare rod-type crystalline titania; and mixing the rod-type crystalline titania with a lithium salt and second-sintering the mixed product to prepare lithium titanate oxide.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
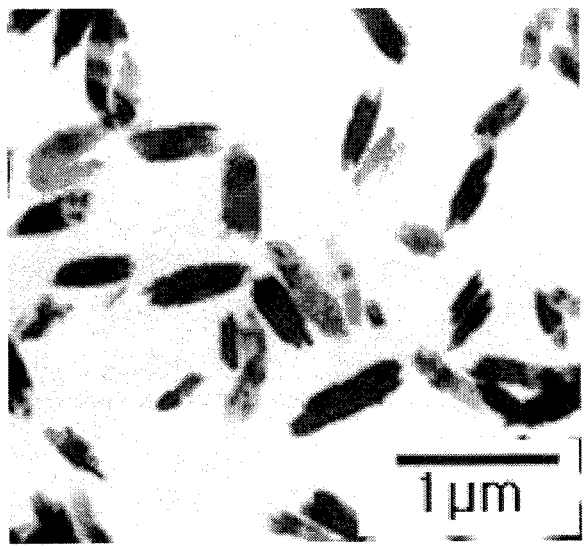
FIG. 1 is a transmission electron microscopic (TEM) image of lithium titanate oxide prepared according to Preparation Example 1.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Hereinafter, example embodiments of a negative active material, a method of preparing the same, a negative electrode comprising the negative active material, and a lithium secondary battery comprising the negative electrode will be described in detail.

According to an embodiment, a negative active material comprises lithium titanate oxide having an area ratio of a diffraction peak of a (111) plane that appears at 2θ=18.3°±0.4 to a diffraction peak of a (311) plane that appears at 2θ=35.5°±0.4, in an XRD spectrum, in the range of about 2.2:1 to about 5.5:1. For example, the area ratio of the diffraction peak of a (111) plane to the diffraction peak of a (311) plane may be in the range of about 3.0:1 to about 4.5:1. When the area ratio of the diffraction peak of a (111) plane to the diffraction peak of a (311) plane is within the range described above, a lithium secondary battery comprising the lithium titanate oxide used as a negative electrode material has high capacity retention rate and excellent charge and discharge characteristics at high rates.

The negative active material comprises lithium titanate oxide comprising, in an XRD spectrum, the diffraction peak of a (111) plane that appears at 2θ=18.3°±0.4, the diffraction peak of a (311) plane that appears at 2θ=35.5°±0.4, and a diffraction peak of a (400) plane that appears at 2θ=43.2°±0.4.

In addition, the negative active material comprises lithium titanate oxide having an area ratio of the diffraction peak of a (111) plane that appears at 2θ=18.3°±0.4 to the diffraction peak of a (400) plane that appears at 2θ=43.2°±0.4, in an XRD spectrum, in the range of about 1.7:1 to about 4.5:1. For example, the area ratio of the diffraction peak of a (111) plane to the diffraction peak of a (400) plane may be in the range of about 2.0:1 to about 3.0:1. A lithium secondary battery comprising, as a negative electrode material, lithium titanate oxide having the area ratio of the diffraction peak of a (111) plane to the diffraction peak of a (400) plane within the range described above has high capacity retention rate and excellent charge and discharge characteristics at high rates.

The negative active material may comprise lithium titanate oxide having an intensity ratio of the diffraction peak of a (111) plane that appears at 2θ=18.3°±0.4 to the diffraction peak of a (311) plane that appears at 2θ=35.5°±0.4, in an XRD spectrum, in the range of about 3:1 to about 6:1. For example, the intensity ratio of the diffraction peak of a (111) plane to the diffraction peak of a (311) plane may be in the range of about 4:1 to about 5:1, for example, 4.11:1.

The negative active material may comprise lithium titanate oxide having an intensity ratio of the diffraction peak of a (111) plane that appears at 2θ=18.3°±0.4 to the diffraction peak of a (400) plane that appears at 2θ=43.2°±0.4, in an XRD spectrum, in the range of about 2.5:1 to about 4:1. For example, the intensity ratio of the diffraction peak of a (111) plane to the diffraction peak of a (400) plane may be 2.81:1.

Particles of the lithium titanate oxide may be of a rod type.

The rod-type lithium titanate oxide exhibits, in XRD measurement, a stronger intensity of the diffraction peak of a (111) plane that appears at 2θ=18.3°±0.4 than that of lithium titanate oxide with other shapes, for example, a spherical shape. This is because the lithium titanate oxide is in the form of a rod, and thus the crystals grow more in a major axis direction, resulting in more development of the (111) plane of the crystals.

Figure 3:
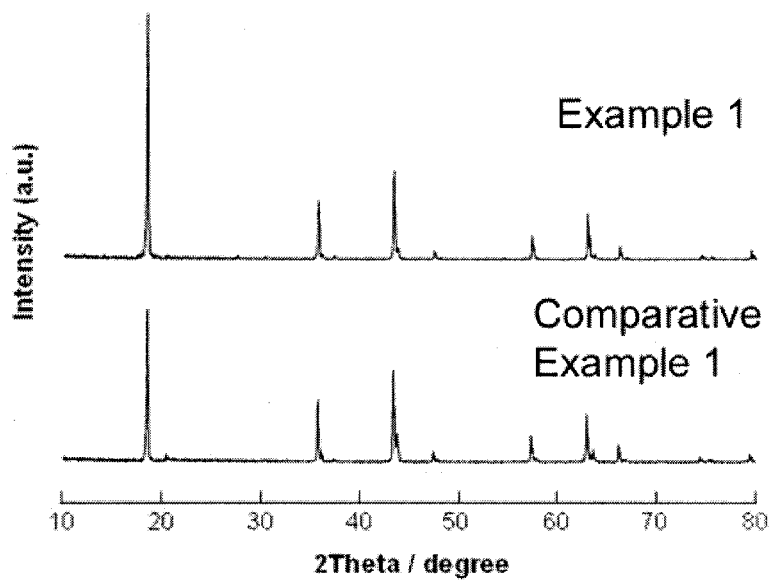
FIG. 3 illustrates X-ray diffraction (XRD) spectra of lithium titanate oxide powders prepared according to Preparation Example 1 and Comparative Preparation Example 1.

The XRD measurement results are confirmed from FIG. 3. FIG. 3 illustrates XRD spectra of rod-type lithium titanate oxide prepared according to Preparation Example 1 and spherical lithium titanate oxide prepared according to Comparative Preparation Example 1.

The term "rod type" used herein indicates that an aspect ratio of particles of the rod-type lithium titanate oxide is 1.5:1 or greater, for example, in the range of about 1.5:1 to about 50:1. For example, the aspect ratio of the particles of the rod-type lithium titanate oxide may be in the range of about 5:1 to about 20:1. The rod-type lithium titanate oxide particles may also be referred to as "cylinder-type lithium titanate oxide particles." When the particles of the lithium titanate oxide have this range of aspect ratio, the (111) plane is developed well, and a lithium secondary battery manufactured using an electrode comprising the lithium titanate oxide described above has excellent charge and discharge characteristics.

The particles of the lithium titanate oxide having the aspect ratio within the range described above may be of a rod type, and this is confirmed from FIG. 1. FIG. 1 is a transmission electron microscopic (TEM) image of lithium titanate oxide prepared according to Preparation Example 1.

The rod-type lithium titanate oxide particles may have a minor axis average length in the range of about 20 nm to about 150 nm, for example, in the range of about 50 nm to about 100 nm.

The rod-type lithium titanate oxide particles may have a major axis average length in the range of about 250 nm to about 950 nm, for example, in the range of about 310 nm to about 890 nm.

When the rod-type lithium titanate oxide particles have the minor and major axis average lengths within the ranges described above, the (111) plane may be developed well.

According to another embodiment, a method of preparing a negative active material comprises preparing a titania precursor seed; growing the titania precursor seed to prepare a rod-type titania precursor; first-sintering the rod-type titania precursor to form a rod-type crystalline titania; and mixing the rod-type crystalline titania with a lithium salt and second-sintering the mixture to prepare lithium titanate oxide.

The lithium titanate oxide prepared using the method described above may comprise, in an XRD spectrum, a diffraction peak of a (111) plane that appears at 2θ=18.3°±0.4, a diffraction peak of a (311) plane that appears at 2θ=35.5°±0.4, and a diffraction peak of a (400) plane that appears at 2θ=43.2°±0.4.

In the XRD spectrum of the lithium titanate oxide, an area ratio of the diffraction peak of a (111) plane that appears at 2θ=18.3°±0.4 to the diffraction peak of a (311) plane that appears at 2θ=35.5°±0.4 may be in the range of about 2.2:1 to about 5.5:1, for example, in the range of about 3.0:1 to about 4.5:1.

In addition, in the XRD spectrum of the lithium titanate oxide, an intensity ratio of the diffraction peak of a (111) plane that appears at 2θ=18.3°±0.4 to the diffraction peak of a (311) plane that appears at 2θ=35.5°±0.4 may be in the range of about 3:1 to about 6:1. For example, the intensity ratio of the diffraction peak of a (111) plane to the diffraction peak of a (311) plane may be in the range of about 4:1 to about 5:1, in particular, 4.11:1.

The lithium titanate oxide may have an area ratio of the diffraction peak of a (111) plane that appears at 2θ=18.3°±0.4 to the diffraction peak of a (400) plane that appears at 2θ=43.2°±0.4, in the XRD spectrum, in the range of about 1.7:1 to about 4.5:1, for example, in the range of about 2.0:1 to about 3.0:1.

In addition, the lithium titanate oxide may have an intensity ratio of the diffraction peak of a (111) plane that appears at 2θ=18.3°±0.4 to the diffraction peak of a (400) plane that appears at 2θ=43.2°±0.4, in the XRD spectrum, in the range of about 2.5:1 to about 4:1, for example, 2.81:1.

The preparing of the titania precursor seed may comprise adding a titanium source to a solvent and hydrolyzing the resultant. The titanium source may be titanium alkoxide, and may be, but is not limited to, at least one selected from the group consisting of titanium isopropoxide, titanium tetraethoxide, titanium tetrapropoxide, titanium tetraisopropoxide, and titanium tetrabutoxide.

The solvent is not particularly limited so long as it is capable of hydrolyzing the titanium source, and may be, for example, at least one selected from the group consisting of water and alcohols such as methanol, ethanol, and propanol. For example, the solvent may be a mixture of water and ethanol. The water may be pure water or distilled water.

The hydrolyzing process may be performed for from about 20 minutes to about 4 hours, for example, for from about 50 minutes to about 2 hours.

The titanium source is hydrolyzed to form a titania precursor seed. For example, the titania precursor seed may be $Ti(OH)_4$. For example, $Ti(OH)_4$ as a titania precursor seed may be formed using titanium isopropoxide as a titania source and a mixture of anhydrous ethanol and distilled water as a solvent.

Subsequently, as described above, the titania precursor seed is grown to prepare the rod-type titania precursor. In this process, a titanium source and an amine-based material having a hydroxyl group are added to the titania precursor seed to grow the titania precursor seed in a rod shape, thereby completing the preparation of the rod-type titania precursor. The amine-based material having a hydroxyl group may be, but is not limited to, at least one selected from the group consisting of triethanolamine, monoethanolamine, and diethanolamine. The titanium source used in the process of preparing the rod-type titania precursor may be the same as the titanium source used in the preparing of the titania precursor seed, which is the former process. A mixing ratio of the titanium source and the amine-based material having a hydroxyl group may vary depending on types of the titanium source and the amine-based material, and may be, for example, in the range of about 1:2 to about 1:3, but is not limited to the above example.

In the process of preparing the rod-type titania precursor, a basic material may be further added to accelerate a reaction between the reactants described above. The basic material may be, but is not limited to, at least one selected from the group consisting of NaOH, KOH, $Ca(OH)_2$, and $NH_4OH$.

The acceleration of the reaction may be adjusted using the basic material at pH in the range of about 9 to about 13, for example, in the range of about 10 to about 12. In addition, the acceleration of the reaction may be performed for about 10 hours, for example, for about 2 to about 5 hours.

The process of preparing the rod-type titania precursor may further comprise washing, filtering and drying processes. In other words, after the titania precursor is formed in a rod shape, the washing, filtering and drying processes are performed thereon to obtain rod-type titania precursor powder. The washing process may be performed several times by using alcohol.

Next, the rod-type titania precursor may be first sintered to form a rod-type crystalline titania, and the first sintering process may be performed in an oxygen atmosphere or in an air atmosphere. The first sintering process may be performed at a temperature in the range of about 300 to about 600° C. at a heating rate in the range of about 2 to about 10° C./min, for example, at a heating rate of 5° C./min. For example, the first sintering process may be performed at a temperature in the range of about 450 to about 500° C. The first sintering process may be performed for about 5 to about 20 hours, for example, for about 10 hours to about 15 hours, but the first sintering time is not limited thereto. The rod-type crystalline titania is formed well within these ranges of heating rate and sintering temperature.

The crystalline titania formed as described above may be of an anatase type, a brookite type, or a rutile type.

The crystalline titania formed using the sintering process described above has a rod type, and the rod-type crystalline titania is used to prepare the rod-type lithium titanate oxide.

The rod-type crystalline titania is mixed with a lithium salt to prepare a mixture of the rod-type crystalline titania and the lithium salt, and the mixture of the rod-type crystalline titania and the lithium salt is subjected to the second sintering process to prepare lithium titanate oxide. The lithium salt may be at least one selected from the group consisting of lithium carbonate, lithium hydroxide, lithium oxide, lithium chloride, lithium nitrate, and lithium acetate. A mixing molar ratio of the rod-type crystalline titania to the lithium salt may be, but is not limited to, 5:4.

The second sintering process may be performed at a temperature in the range of about 500 to about 1000° C. at a heating rate in the range of about 2 to about 10° C./min, for example, at a heating rate of 5° C./min. For example, the second sintering process may be performed at 850° C. The lithium titanate oxide is formed well at this range of temperature described above. In addition, the second sintering process may be performed for about 2 to about 15 hours, for example, for about 4 to about 10 hours, but the second sintering time is not limited to the above example. The lithium titanate oxide has strong crystallinity when the second sintering process is performed for this range of time described above.

The lithium titanate oxide prepared as described above comprises, in XRD measurement, a diffraction peak of a (111) plane in the vicinity of $2\theta=18.3°$, a diffraction peak of a (311) plane in the vicinity of $2\theta=35.5°$, and a diffraction peak of a (400) plane in the vicinity of $2\theta=43.2°$.

In addition, the lithium titanate oxide may have an area ratio of the diffraction peak of a (111) plane in the vicinity of $2\theta=18.3°$ to the diffraction peak of a (311) plane in the vicinity of $2\theta=35.5°$ in the range of about 2.2:1 to about 5.5:1, for example, in the range of about 3.0:1 to about 4.5:1.

Also, the lithium titanate oxide may have an area ratio of the diffraction peak of a (111) plane in the vicinity of $2\theta=18.3°$ to the diffraction peak of a (400) plane in the vicinity of $2\theta=43.2°$ in the range of about 1.7:1 to about 4.5:1, for example, in the range of about 2.0:1 to about 3.0:1.

The lithium titanate oxide prepared as described above may have an aspect ratio of 1.5:1 or greater, for example, in the range of about 1.5:1 to about 50:1, for example, in the range of about 5:1 to about 20:1.

The particles of the rod-type lithium titanate oxide may have a minor axis average length in the range of about 20 nm to about 150 nm, for example, in the range of about 50 nm to about 100 nm, and may have a major axis average length in the range of about 250 nm to about 950 nm, for example, in the range of about 310 nm to about 890 nm.

According to another embodiment, a negative electrode for a lithium secondary battery comprises the negative active material comprising lithium titanate oxide.

For example, the negative electrode may be prepared as follows.

First, a negative active material comprising the lithium titanate oxide, a conductive material, a binder, and a solvent are mixed together to prepare a negative electrode composition, and the negative electrode composition is then coated on a current collector and dried, thereby completing the preparation of the negative electrode. Any current collector that is commonly used to form an electrode may be used. For example, the current collector may be a copper (Cu) current collector or an aluminum (Al) current collector, but is not limited to the above example.

The negative active material comprising the lithium titanate oxide, the conductive material, and the binder may be mixed at a ratio that is commonly used in preparing a negative electrode composition, and the mixing ratio may vary depending on types of the negative active material, the conductive material, and the binder. For example, the negative active material, the conductive material, and the binder are mixed at a ratio of 90:5:5, and the resulting mixture is added to a solvent to prepare a composition for forming a negative electrode, but the mixing ratio is not limited to the above example. The negative active material comprising lithium titanate oxide may further comprise a negative active material that is generally used to manufacture a lithium secondary battery.

The conductive material may be any electroconductive materials so long as it has a suitable conductivity without causing chemical changes in the fabricated battery. Examples of the electroconductive material comprise carbonaceous materials such as natural graphite, artificial graphite, carbon black, acetylene black, Ketjen black, Denka black, and carbon fibers; metallic materials such as metallic powders and fibers of copper, nickel, aluminum, and silver; and conductive materials such as conductive polymers, for example, polyphenylene derivatives and mixtures thereof.

The binder may be selected from known binder used to form an active material layer. The binder assists in binding between the particles of the negative active material and in attachment of the negative active material to the current collector. Examples of the binder comprise, but are not limited to, polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, and nylon. For example, the binder may be a polyvinylidene fluoride (PVdF)-based binder. The amount of the binder may be the same level as that used to form an active material layer.

The solvent may be any solvent that is used in a general composition for forming an active material layer. Examples of the solvent comprise linear carbonates such as dimethyl carbonate, ethylmethyl carbonate, diethyl carbonate, and dipropyl carbonate, cyclic carbonates such as a fatty acid ester derivative, ethylene carbonate, propylene carbonate, and butylene carbonate, γ-butyrolactone, N-methylpyrrolidone (NMP), acetone, and water. The solvent may be used in a combination of at least two of these materials.

According to another embodiment, a lithium secondary battery comprises the negative electrode described above, a positive electrode, and a separator.

For example, the lithium secondary battery may be manufactured as follows. First, a negative electrode comprising the lithium titanate oxide described above is prepared.

Next, the positive electrode as a counter electrode of the negative electrode may be fabricated as follows.

A positive active material, a conductive material, a binder, and a solvent are mixed together to prepare a positive active material composition. The positive active material composition is directly coated on a current collector and the resulting product is then dried to fabricate a positive electrode plate. Alternatively, the positive active material composition is cast on a separate support to form a positive active material film, and the positive active material film separated from the support is laminated on the current collector to fabricate a positive electrode plate. The current collector may be, but is not limited to, an Al current collector used as a general positive electrode current collector.

The conductive material, the binder, and the solvent in the positive active material composition may be those that are commonly used in preparing an electrode composition. Examples thereof are already provided in the description with regards to the negative electrode.

The positive active material may be a compound that allows reversible intercalation and deintercalation of lithium ions. In particular, the compound may be at least one of the complex oxides of lithium and a metal selected from the group consisting of cobalt, manganese, nickel, and a combination thereof. The compound may be, but is not limited to, a compound represented by one formula selected from the group consisting of $Li_aA_{1-b}X_bD_2$ where $0.95 \le a \le 1.1$ and $0 \le b \le 0.5$; $Li_aE_{1-b}X_bO_{2-c}D_c$ where $0.95 \le a \le 1.1$, $0 \le b \le 0.5$, and $0 \le c \le 0.05$; $LiE_{2-b}X_bO_{4-c}D_c$ where $0 \le b \le 0.5$ and $0 \le c \le 0.05$; $Li_aNi_{1-b-c}Co_bB_cD_\alpha$ where $0.95 \le a \le 1.1$, $0 \le b \le 0.5$, $0 < \alpha c \le 0.05$, and $0 < \alpha \le 2$; $Li_aNi_{1-b-c}Co_bX_cO_{2-\alpha}M_\alpha$ where $0.95 \le a \le 1.1$, $0 \le b \le 0.5$, $0 \le c \le 0.05$, and $0 < \alpha < 2$; $Li_aNi_{1-b-c}Co_bX_cO_{2-\alpha}M_2$ where $0.95 \le a \le 1.1$, $0 \le b \le 0.5$, $0 \le c \le 0.05$, and $0 < \alpha < 2$; $Li_aNi_{1-b-c}Mn_bX_cD_\alpha$ where $0.95 \le a \le 1.1$, $0 \le b \le 0.5$, $0 \le c \le 0.05$, and $0 < \alpha \le 2$; $Li_aNi_{1-b-c}Mn_bX_cO_{2-\alpha}M_\alpha$ where $0.95 \le a \le 1.1$, $0 \le b \le 0.5$, $0 \le c \le 0.05$, and $0 < \alpha < 2$; $Li_aNi_{1-b-c}Mn_bX_cO_{2-\alpha}M_2$ where $0.95 \le a \le 1.1$, $0 \le b \le 0.5$, $0 \le c \le 0.05$, and $0 < \alpha < 2$; $Li_aN i_bE_cG_dO_2$ where $0.90 \le a \le 1.1$, $0 \le b \le 0.9$, $0 \le c \le 0.5$, and $0.001 \le d \le 0.1$; $Li_aNi_bCo_cMn_dG_eO_2$ where $0.90 \le a \le 1.1$, $0 \le b \le 0.9$, $0 \le c \le 0.5$, $0 \le d \le 0.5$, and $0.001 \le e \le 0.1$; $Li_aNiG_bO_2$ where $0.90 \le a \le 1.1$ and $0.001 \le b \le 0.1$; $Li_aCoG_bO_2$ where $0.90 \le a \le 1.1$ and $0.001 \le b \le 0.1$; $Li_aMnG_bO_2$ where $0.90 \le a \le 1.1$ and $0.001 \le b \le 0.1$; $Li_aMn_2G_bO_4$ where $0.90 \le a \le 1.1$ and $0.001 \le b \le 0.1$; $QO_2$; $QS_2$; $LiQS_2$; $V_2O_5$; $LiV_2O_5$; $LiZO_2$; $LiNiVO_4$; $Li_{(3-f)}J_2(PO_4)_3$ where $0 \le f \le 2$; $Li_{(3-f)}Fe_2(PO_4)_3$ where $0 \le f \le 2$; and $LiFePO_4$.

In the formulae above, A may be one selected from the group consisting of nickel (Ni), cobalt (Co), manganese (Mn), and any combinations thereof; X may be one selected from the group consisting of aluminum (Al), Ni, Co, Mn, chromium (Cr), iron (Fe), magnesium (Mg), strontium (Sr), vanadium (V), a rare earth element, and any combinations thereof; D may be one selected from the group consisting of oxygen (O), fluorine (F), sulfur (S), phosphorus (P), and any combinations thereof; E may be one selected from the group consisting of Co, Mn, and any combinations thereof; M may be one selected from the group consisting of F, S, P, and any combinations thereof; G may be one selected from the group consisting of Al, Cr, Mn, Fe, lanthanum (La), cerium (Ce), strontium (Sr), V, and any combinations thereof; Q may be one selected from the group consisting of titanium (Ti), molybdenum (Mo), Mn, and any combinations thereof; Z may be one selected from the group consisting of Cr, V, Fe, scandium (Sc), yttrium (Y), and any combinations thereof; and J may be one selected from the group consisting of V, Cr, Mn, Co, Ni, copper (Cu), and any combinations thereof, but are not limited thereto.

Also, the above-mentioned compound with a coating layer on the surface may be used, or a mixture of the compound described above and another compound having a coating layer may be used. The coating layer may comprise at least one coating element compound selected from the group consisting of an oxide of a coating element, a hydroxide of a coating element, an oxyhydroxide of a coating element, an oxycarbonate of a coating element, and a hydroxyl carbonate of a coating element. The compound constituting the coating layer may be amorphous or crystalline. The coating element comprised in the coating layer may be Mg, Al, Co, potassium (K), sodium (Na), calcium (Ca), silicon (Si), Ti, V, tin (Sn), germanium (Ge), gallium (Ga), boron (B), arsenic (As), zirconium (Zr), or a mixture thereof.

The coating layer may be formed by comprising these elements in the compound by using a method having no adverse influence on properties of the positive active material, such as spray coating or dipping. However, the preparation method of the coating layer is not particularly limited, and it is well understood by one of ordinary skill in the art. Thus, a detailed description thereof is not provided herein.

The separator may be any separator that is commonly used in lithium secondary batteries. In particular, the separator may have low resistance to migration of ions in an electrolyte and may have a high electrolyte-retaining ability. Examples of the separator may comprise glass fiber, polyester, Teflon, polyethylene, polypropylene, polytetrafluoroethylene (PTFE), and combinations thereof, each of which may be a nonwoven fabric or a woven fabric. For example, a windable separator such as polyethylene, polypropylene or the like may be used for a lithium ion battery, and a separator that may retain a large amount of an organic electrolytic solution may be used for a lithium-ion polymer battery.

The electrolyte may be any electrolyte that is commonly used in lithium secondary batteries.

The electrolyte may comprise a non-aqueous organic solvent and a lithium salt. The electrolyte, if necessary, may further comprise various kinds of additives such as an overcharge preventing agent.

The non-aqueous organic solvent may act as a medium through which ions involved in an electrochemical reaction of a battery may be transported.

The non-aqueous organic solvent may be a carbonate-based solvent, an ester-based solvent, an ether-based solvent, a ketone-based solvent, an alcohol-based solvent, or an aprotic solvent. Examples of the carbonate-based solvent comprise dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and ethylmethyl carbonate (EMC). Examples of the ester-based solvent comprise methyl acetate, ethyl acetate, n-propyl acetate, dimethylacetate, methylpropionate, ethylpropionate, γ-butyrolactone, decanolide, valerolactone, mevalonolactone, and caprolactone. Examples of the ether-based solvent comprise dibutylether, tetraglyme, diglyme, dimethoxyethane, 2-methyltetrahydrofurane, and tetrahydrofurane. The ketone-based solvent may be cyclohexanone. Examples of the alcohol-based solvent comprise ethylalcohol and isopropyl alcohol. Examples of the aprotic solvent comprise: nitriles such as R—CN, where R is a linear, branched, or cyclic $C_2$ to $C_{20}$ hydrocarbon group and has a double-bond containing aromatic ring or an ether bond; amides such as dimethylformamide; and dioxolane-based sulfolanes such as 1,3-dioxolane.

The non-aqueous organic solvents may be used alone or in combination. If the non-aqueous organic solvents are used in combination, the mixing ratio may be appropriately controlled, according to a desired battery performance, and it may be well understood by one of ordinary skill in the art.

The lithium salt is dissolved in the non-aqueous organic solvent, acts as a lithium ion source in a battery, and promotes the movement of lithium ions between the positive electrode and the negative electrode. The lithium salt may be at least one supporting electrolytic salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN$ $(C_xF_{2x+1}SO_2)(C_yF_{2y+1}SO_2)$ where x and y are natural numbers, LiCl, LiI, and $LiB(C_2O_4)_2$ (lithium bis(oxalato) borate; LiBOB). The concentration of the lithium salt may be in the range of about 0.1 to about 2.0 M. When the concentration of the lithium salt is within this range, the electrolyte has appropriate levels of conductivity and viscosity and thus has excellent electrolytic performance, and lithium ions may be effectively transferred.

The separator is disposed between the positive electrode plate and the negative electrode plate to form a battery assembly. The battery assembly is wound or folded, and then accommodated in a cylindrical battery case or in a rectangular battery case, and an electrolyte is injected into the battery case, thereby completing the manufacture of a lithium ion battery. Also, a plurality of battery assemblies may be stacked in a bi-cell structure and impregnated into an electrolytic solution. The resultant is put into a pouch and hermetically sealed, thereby completing the manufacture of a lithium secondary battery.

Figure 5:
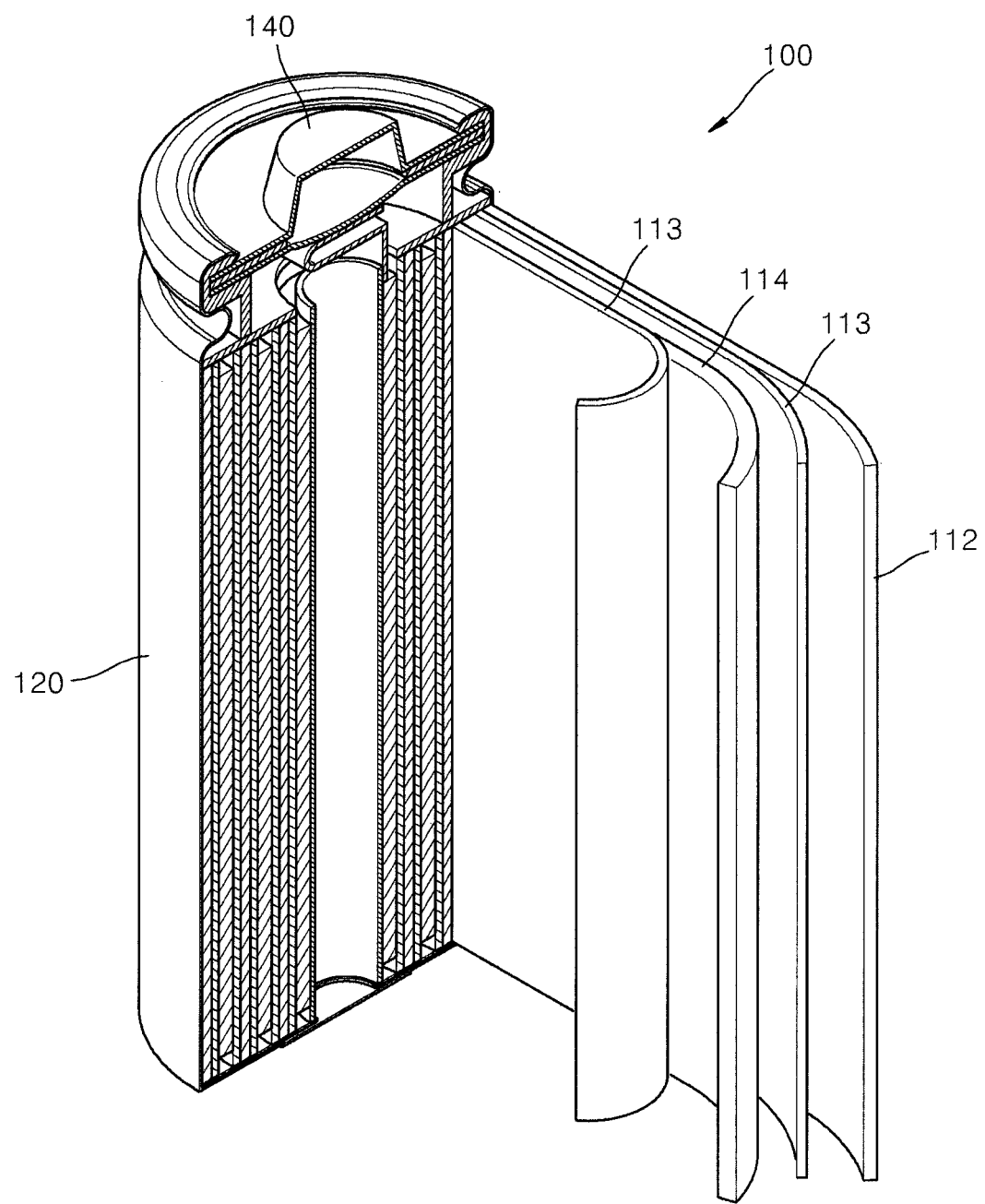
FIG. 5 is a schematic diagram of a lithium secondary battery according to an embodiment.

FIG. 5 is a schematic diagram of a lithium secondary battery 100 according to an embodiment.

Referring to FIG. 5, the lithium secondary battery 100 comprises a positive electrode 114, a negative electrode 112, a separator 113 disposed between the positive electrode 114 and the negative electrode 112, an electrolyte (not shown) with which the positive electrode 114, the negative electrode 112, and the separator 113 are impregnated, a battery case 120, and a sealing member 140 that seals the battery case 120. The lithium secondary battery 100 is manufactured in such a manner that the positive electrode 114, the negative electrode 112, and the separator 113 are sequentially stacked to form a battery assembly, the battery assembly is spirally wound, and then accommodated in the battery case 120.

One or more embodiments will now be described in more detail with reference to the following examples. However, these examples are not intended to limit the scope of the embodiments.

Preparation Example 1

Preparation of Rod-Type Lithium Titanate Oxide 789 g of anhydrous ethanol and 80 g of distilled water which are used as a solvent were added to a chemical reactor equipped with a condenser, the temperature of the chemical reactor was raised by 60° C. while the solvents were being mixed.

Subsequently, 80 g of titanium isopropoxide was added to the heated mixed solvent, and the resulting mixture was hydrolyzed for 1 hour to prepare $Ti(OH)_4$ particles as titania precursor seed particles. Thereafter, 250 g of titanium isopropoxide and 394 g of triethanolamine were mixed together at a room temperature, the mixture was added to the chemical reactor including the $Ti(OH)_4$ particles, and NaOH was added to the chemical reactor until the pH of the resulting mixture reached 11. While the reaction temperature was maintained at 60° C., the reaction between the reactants was induced for 3 hours to grow rod-type titania precursor particles. After the reaction was terminated, the resultant was washed several times with ethanol and filtered to obtain rod-type titania precursor powder. After the temperature of the chemical reactor was raised up to 480° C. at a heating rate of 5° C./min, the obtained powder was sintered for 10 hours to prepare rod-type crystalline titania ($TiO_2$).

The rod-type crystalline titania ($TiO_2$) and lithium carbonate were mixed in a mixer at a molar ratio of 5:4. After the temperature of the chemical reactor was raised up to 850° C.

at a heating rate of 5° C./min, the resulting mixture was sintered at 850° C. for 5 hours to obtain rod-type lithium titanate oxide ($Li_4Ti_5O_{12}$) powder. A transmission electron microscopic (TEM) image of the obtained rod-type lithium titanate oxide ($Li_4Ti_5O_{12}$) powder is illustrated in FIG. 1.

The TEM image of FIG. 1 confirms that the rod-type lithium titanate oxide is formed.

Comparative Preparation Example 1

Preparation of Lithium Titanate Oxide 62.5 g of lithium carbonate and 406.4 g of titania were subjected to dry mixing in a powder mixer for 10 minutes to prepare a mixed powder in which the lithium carbonate and titania were homogenously mixed. After the temperature of the powder mixer was raised up to 850° C. at a heating rate of 5° C./min, the mixed powder was sintered at 850° C. for 5 hours to obtain lithium titanate oxide particles.

Figure 2:
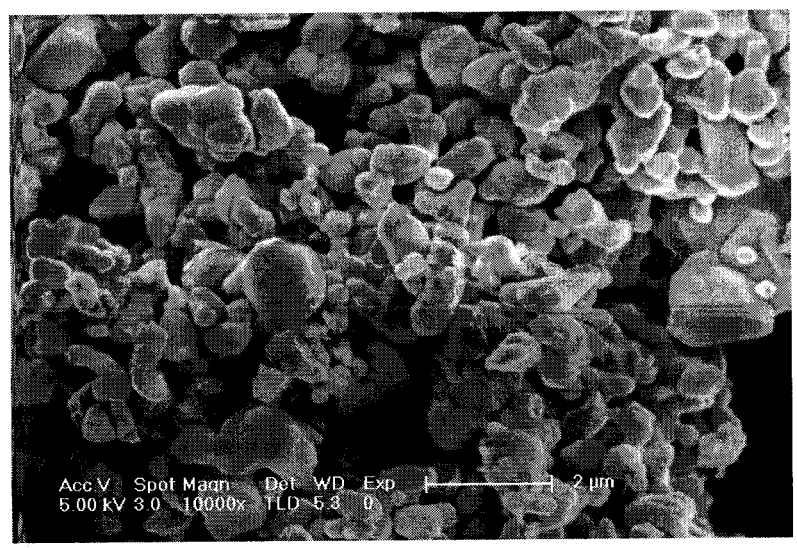
FIG. 2 is a scanning electron microscopic (SEM) image of lithium titanate oxide prepared according to Comparative Preparation Example 1.

As illustrated in FIG. 2, it is confirmed that the lithium titanate oxide particles prepared according to Comparative Preparation Example 1 is not in a rod shape, unlike the rod-type lithium titanate oxide particles of Preparation Example 1.

Evaluation Example 1

XRD Spectrum

XRD analysis was performed on the lithium titanate oxide particles of Preparation Example 1 and Comparative Preparation Example 1, and the XRD analysis results are illustrated in FIG. 3. An area ratio of a peak of a (111) plane to a peak of a (311) plane, an area ratio of the peak of a (111) plane to a peak of a (400) plane, an intensity ratio of the peak of a (111) plane to the peak of a (311) plane, and an intensity ratio of the peak of a (111) plane to the peak of a (400) plane are shown in Table 1 below.

The areas of the peaks described above were calculated by the following equation:

Peak area ($Ap$)=total peak area ($At$)–baseline-subtracted area ($Ab$)

The area of each of the XRD peaks measured using an X'pert Pro MPD device available from Philips was obtained by integration using the above equation.

TABLE 1

|  | Preparation Example 1 | Comparative Preparation Example 1 |
| --- | --- | --- |
| Area ratio of peak of (111) plane to peak of (311) plane | 3.85:1 | 1.82:1 |
| Area ratio of peak of (111) plane to peak of (400) plane | 2.63:1 | 1.36:1 |
| Intensity ratio of peak of (111) plane to peak of (311) plane | 4.11:1 | 2.40:1 |
| Intensity ratio of peak of (111) plane to peak of (400) plane | 2.81:1 | 1.69:1 |

As illustrated in FIG. 3, in the XRD measurement of the lithium titanate oxide of Preparation Example 1, the peak of a (111) plane that appears at 2θ=about 18.3°, the peak of a (311) plane that appears at 2θ=about 35.5°, and the peak of a (400) plane that appears at 2θ=about 43.2° were observed.

In addition, as illustrated in FIG. 3, in the XRD measurement of the lithium titanate oxide of Comparative Preparation Example 1, the peak of a (111) plane that appears at 2θ=about 18.3°, the peak of a (311) plane that appears at 2θ=about 35.5°, and the peak of a (400) plane that appears at 2θ=about 43.2° were observed.

As shown in Table 1 above, an area ratio of the peak of a (111) plane that appears at 2θ=about 18.3° to the peak of a (311) plane that appears at 2θ=about 35.5° of the lithium titanate oxide of Comparative Preparation Example 1 was 1.82:1, and an area ratio of the peak of a (111) plane that appears at 2θ=about 18.3° to the peak of a (311) plane that appears at 2θ=about 35.5° of the lithium titanate oxide of Preparation Example 1 was 3.85:1.

In addition, as shown in Table 1 above, an intensity ratio of the peak of a (111) plane that appears at 2θ=about 18.3° to the peak of a (311) plane that appears at 2θ=about 35.5° of the lithium titanate oxide of Comparative Preparation Example 1 was 2.40:1, and an intensity ratio of the peak of a (111) plane that appears at 2θ=about 18.3° to the peak of a (311) plane that appears at 2θ=about 35.5° of the lithium titanate oxide of Preparation Example 1 was 4.11:1.

In addition, an area ratio of the peak of a (111) plane that appears at 2θ=about 18.3° to the peak of a (400) plane that appears at 2θ=about 43.2° of the lithium titanate oxide of Comparative Preparation Example 1 was 1.36:1, and an area ratio of the peak of a (111) plane that appears at 2θ=about 18.3° to the peak of a (400) plane that appears at 2θ=about 43.2° of the lithium titanate oxide of Preparation Example 1 was 2.63:1.

In addition, as shown in Table 1 above, an intensity ratio of the peak of a (111) plane that appears at 2θ=about 18.3° to the peak of a (400) plane that appears at 2θ=about 43.2° of the lithium titanate oxide of Comparative Preparation Example 1 was 1.69:1, while an intensity ratio of the peak of a (111) plane that appears at 2θ=about 18.3° to the peak of a (400) plane that appears at 2θ=about 43.2° of the lithium titanate oxide of Preparation Example 1 was 2.81:1.

From the XRD analysis results illustrated in FIG. 3, it is confirmed that crystals of the lithium titanate oxide of Preparation Example 1 grow in a rod shape, and thus the intensity of the peak corresponding to a (111) plane is stronger than that in the lithium titanate oxide of Comparative Preparation Example 1.

Example 1

Manufacture of Coin Cell

The lithium titanate oxide of Preparation Example 1, a binder, and a conductive material were mixed at a ratio of 90:5:5, and N-methylpyrrolidone was added to the mixture to prepare a slurry. Polyvinylidene fluoride (PVDF) was used as a binder and Denka black was used as a conductive material. The slurry was coated on an Al foil to prepare a negative electrode. The obtained negative electrode was pressed to a thickness of 63 μm and dried in a vacuum drier at 130° C. for 12 hours. A Li metal was used as a counter electrode, a polypropylene-based film was used as a separator, and 1 M of $LiPF_6$ (EC/EMC at a volume ratio of 3:7) was used as an electrolytic solution, thereby completing the manufacture of a coin cell.

Comparative Example 1

Manufacture of Coin Cell

A coin cell was manufactured in the same manner as in Example 1, except that the lithium titanate oxide of Comparative Preparation Example 1 was used.

Evaluation Example 2

Capacity and charge/discharge efficiency of each of the coin cells of Example 1 and Comparative Example 1 were evaluated during one cycle of charging and discharging (FM, formation step), wherein the charging process was performed in a constant current (CC) at a rate of 0.2 C to 0.9 V (vs. Li) and then in a constant voltage (CV) of 0.9 V to a cut-off current of 0.01 C and the discharging process was performed in a constant current (CC) at a rate of 0.2 C to a cut-off voltage of 3.0 V (vs. Li). Subsequently, discharge capacities and capacity retention ratios of the coin cells of Example 1 and Comparative Example 1 were evaluated at discharge rates of 0.2 C, 0.5 C, 1 C, 2 C, 5 C, and 10 C, respectively. The results are shown in Table 2 below and illustrated in FIG. 4.

TABLE 2

| | Example 1 | | Comparative Example 1 | |
|---|---|---|---|---|
| C-rate | Discharge capacity (mAh/g) | Capacity retention ratio (%) | Discharge capacity (mAh/g) | Capacity retention ratio (%) |
| FM | 167.88 | 100.00 | 166.74 | 100.00 |
| 0.2 C | 167.13 | 99.55 | 163.89 | 98.29 |
| 0.5 C | 165.88 | 98.81 | 161.79 | 97.03 |
| 1 C | 164.52 | 98.00 | 159.53 | 95.68 |
| 2 C | 162.78 | 96.96 | 155.51 | 93.26 |
| 5 C | 159.33 | 94.91 | 150.98 | 90.55 |
| 10 C | 156.85 | 93.43 | 150.11 | 90.03 |

As shown in Table 2 above, as a result of evaluating C-rate-based discharge capacities of the coin cell of Example 1, the coin cell of Example 1 has an initial discharge capacity of 167.88 mAh/g, which accounts for 95% or greater of the theoretical capacity of lithium titanate oxide. In addition, the coin cell of Example 1 has a capacity retention rate of 94.91% at 5 C, and a capacity retention rate of 93.43% at 10 C. From the results, it is confirmed that the coin cell of Example 1 exhibits better high-rate characteristics than the coin cell of Comparative Example 1.

Figure 4:
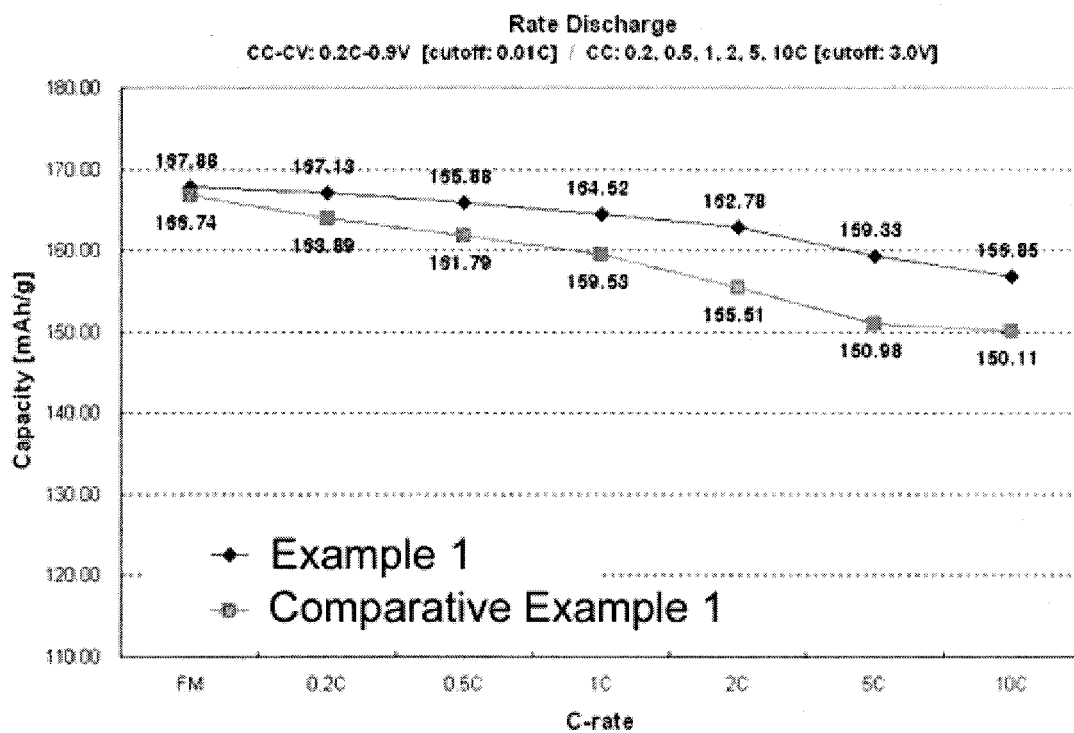
FIG. 4 is a graph showing charge and discharge characteristics of coin cells manufactured according to Example 1 and Comparative Example 1.

The result is confirmed from FIG. 4.

As described above, according to the one or more of the above embodiments, a lithium secondary battery comprising a negative electrode comprising rod-type lithium titanate oxide may have enhanced high-rate characteristics.

It should be understood that the example embodiments described therein should be considered in a descriptive sense only and not for purposes of limitation. Descriptions of features or aspects within each embodiment should typically be considered as available for other similar features or aspects in other embodiments.

What is claimed is:

1. A negative active material consisting of crystalline lithium titanate oxide having an area ratio of a diffraction peak of a (111) plane that appears at $2\theta=18.3°\pm0.4$ to a diffraction peak of a (311) plane that appears at $2\theta=35.5°\pm0.4$, in an X-ray diffraction spectrum, of about 2.2:1 to about 5.5:1 and having an intensity ratio of the diffraction peak of a (111) plane that appears at $2\theta=18.3°\pm0.4$ to the diffraction peak of a (400) plane that appears at $2\theta=43.2°\pm0.4$, in the XRD spectrum, of about 2.5:1 to about 4:1, wherein the lithium titanate oxide is of a rod type, wherein the lithium titanate oxide has a minor axis average length of about 50 nm to about 100 nm and a major axis average length of about 250 nm to about 950 nm.

2. The negative active material of claim 1, wherein the lithium titanate oxide has an area ratio of the diffraction peak of a (111) plane that appears at $2\theta=18.3°\pm0.4$ to a diffraction peak of a (400) plane that appears at $2\theta=43.2°\pm0.4$, in an X-ray diffraction spectrum, of about 1.7:1 to about 4.5:1.

3. The negative active material of claim 1, wherein the lithium titanate oxide has an intensity ratio of the diffraction peak of a (111) plane that appears at $2\theta=18.3°\pm0.4$ to the diffraction peak of a (311) plane that appears at $2\theta=35.5°\pm0.4$, in an X-ray diffraction spectrum, of about 3:1 to about 6:1.

4. The negative active material of claim 1, wherein the lithium titanate oxide has an intensity ratio of the diffraction peak of a (111) plane that appears at $2\theta=18.3°\pm0.4$ to a diffraction peak of a (400) plane that appears at $2\theta=43.2°\pm0.4$, in an X-ray diffraction spectrum, of about 2.5:1 to about 4:1.

5. The negative active material of claim 1, wherein the lithium titanate oxide has an aspect ratio of 1.5:1 or greater.

6. The negative active material of claim 1, wherein the lithium titanate oxide has an aspect ratio of about 1.5:1 to about 50:1.

7. A negative electrode comprising the negative active material according to claim 1.

8. A lithium secondary battery comprising the negative electrode of claim 7, a positive electrode, and a separator.

* * * * *